United States Patent
Sundareswara et al.

(10) Patent No.: US 11,549,611 B2
(45) Date of Patent: Jan. 10, 2023

(54) FAULT PREDICTION IN VALVE SYSTEMS THROUGH BAYESIAN FRAMEWORK

(71) Applicant: THE BOEING COMPANY, Chicago, IL (US)

(72) Inventors: Rashmi Sundareswara, Topanga, CA (US); Tsai-Ching Lu, Thousand Oaks, CA (US); Franz D. Betz, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 1255 days.

(21) Appl. No.: 15/984,551

(22) Filed: May 21, 2018

(65) Prior Publication Data

US 2019/0353277 A1 Nov. 21, 2019

(51) Int. Cl.
*F16K 37/00* (2006.01)
*G06N 7/00* (2006.01)
(Continued)

(52) U.S. Cl.
CPC ...... *F16K 37/0083* (2013.01); *F16K 37/0025* (2013.01); *F16K 37/0041* (2013.01);
(Continued)

(58) Field of Classification Search
CPC .............. G05B 23/0283; G05B 23/024; F16K 37/0083; F16K 37/0041; F16K 37/0025; G06N 7/005; G06N 20/00
See application file for complete search history.

(56) References Cited

U.S. PATENT DOCUMENTS

| 2009/0055130 A1* | 2/2009 | Pandey | G05B 23/0254 |
| | | | 702/183 |
| 2010/0138267 A1* | 6/2010 | Vittal | F03D 17/00 |
| | | | 702/34 |

(Continued)

OTHER PUBLICATIONS

U.S. Appl. No. 15/464,044, "Data-Driven Unsupervised Algorithm for Analyzing Sensor Data to Detect Abnormal Valve Operation," filed Mar. 20, 2017.

(Continued)

*Primary Examiner* — Atif H Chaudry
(74) *Attorney, Agent, or Firm* — Patterson + Sheridan, LLP

(57) ABSTRACT

Systems and methods for fault prediction through a Bayesian framework are provided. Fault prediction for a valve system may be provided by generating a Bayesian framework by collecting a plurality of historical parameters related to opening and closing of a valve across a plurality of operational legs; generating a plurality of historical feature metrics based on the plurality of historical parameters; in response to detecting a fault, defining a prefault state corresponding to the historical feature metrics; monitoring a plurality of operational parameters related to opening and closing of the valve during a given operational phase of an operational leg; generating a plurality of operational feature metrics based on the plurality of operational parameters monitored during the given operational phase; and in response to determining, using the generated Bayesian framework, that the operational feature metrics indicate the prefault state of the subsystem, generating a notification.

18 Claims, 4 Drawing Sheets

(51) Int. Cl.
   *G05B 23/02* (2006.01)
   *G06N 20/00* (2019.01)
(52) U.S. Cl.
   CPC ....... *G05B 23/024* (2013.01); *G05B 23/0283* (2013.01); *G06N 7/005* (2013.01); *G06N 20/00* (2019.01)

(56) References Cited

U.S. PATENT DOCUMENTS

| | | | | |
|---|---|---|---|---|
| 2013/0152673 | A1* | 6/2013 | Young | F23N 1/002 73/40.7 |
| 2016/0092808 | A1* | 3/2016 | Cheng | G06Q 10/0635 705/7.28 |
| 2018/0173216 | A1* | 6/2018 | Spiro | G05B 23/0237 |
| 2018/0174067 | A1* | 6/2018 | Spiro | G06N 20/00 |
| 2018/0364654 | A1* | 12/2018 | Locke | F24F 11/63 |
| 2019/0294987 | A1* | 9/2019 | Luan | G06N 5/04 |

OTHER PUBLICATIONS

Byington, C. S., Watson, M., Edwards, D., and Dunkin, B. 2003. In-Line Health Monitoring System for Hydraulic Pumps and Motors Proceedings of the IEEE Aerospace Conference. New York: IEEE., 10 pages.

Byington, C. S., Watson, M., and Edwards, D. 2004c. Dynamic Signal Analysis and Neural Network Modeling for Life Prediction of Flight Control Actuators. Proceedings of the American Helicopter Society 60th Annual Forum. Alexandria, VA: AHS.

Furse, Cynthia, Lo, Chet. "Reflectometry for Locating Wiring Faults". IEEE Transactions on Electromagnetic Compatibility. Feb. 2005.

Gelman, Andrew; Carlin, John B.; Stern, Hal S.; Dunson, David B.;Vehtari, Aki; Rubin, Donald B. (2013). Bayesian Data Analysis, Third Edition. Chapman and Hall/CRC ISBN 978-1-4398-4095-5.

Ghidella, J. and Mosterman, P. Requirements-Based Testing in Aircraft Control Design, Paper ID AIAA 2005-5886 in AIAA Modeling and Simulations Technologies Conference and Exhibit 2005, Aug. 15-18, San Francisco, California, 2005.

Kobayashi, T., and Simon, D. L., 2003, "Application of a Bank of Kalman Filters for Aircraft Engine Fault Diagnostics," Turbo Expo, Atlanta, GA, Jun. 16-19.

Reshef, D. N., Reshef, Y. A.; Finucane, H. K., Grossman, S. R.; McVean, G., Tumbaugh, P. J., Lander, E. S., Mitzenmacher, M. et al. (2011) "Detecting Novel Associations in Large Data Sets". Science 334 (6062): 1518-1524.

Smith,Paul, Furse, Cynthia and Gunther, Jacob. "Analysis of Spread Spectrum Time Domain Reflectometry for Wire Fault Location." IEEE Sensors Journal. Dec. 2005.

\* cited by examiner

FAULT PREDICTION IN VALVE SYSTEMS THROUGH BAYESIAN FRAMEWORK

FIELD

Aspects of the present disclosure provide improvements in computing devices used in fault prediction, and more specifically, to fault prediction in complex systems through use of a Bayesian framework.

BACKGROUND

As complex systems, such as aircraft, are often subject to strict regulation and safety checks, the unexpected fault of even minor subsystems can remove the complex system from service for extended periods of time for unscheduled maintenance. Conventional solutions for fault detection include preventative maintenance schedules and procedures. However, such conventional solutions merely provide general guidelines for maintaining complex systems over time and do not account for the specific state of any one complex system at a given moment in time.

SUMMARY

The present disclosure provides, in one embodiment, a method for fault prediction comprising: monitoring a plurality of parameters of a subsystem of a complex system related to opening and closing of a valve of the subsystem; collecting a first set of data values for the plurality of parameters during a first operational phase of the complex system; generating a first plurality of feature metrics based on first set of data values for the plurality of parameters; detecting a fault in the subsystem in a second operational phase of the complex system; collecting a second set of data values for the plurality of parameters during the second operational phase of the complex subsystem; generating a second plurality of feature metrics based on second set of data values for the plurality of parameters; and, defining a prefault state for the feature metrics according to a Bayesian framework based on the first plurality of feature metrics and the second plurality of feature metrics.

In one aspect, in combination with any example above or below, the plurality of parameters include: temperature; pressure; state data for a component of the subsystem; humidity; and, flowrate.

In one aspect, in combination with any example above or below, the plurality of feature metrics include: a maximum value feature metric for each parameter of the plurality of parameters; a minimum value feature metric for each parameter of the plurality of parameters; and, a mean value feature metric for each parameter of the plurality of parameters.

In one aspect, in combination with any example above or below, the plurality of feature metrics include: an open/close imbalance feature metric derived from state data indicating a portion of time for which the valve is open relative to time for which the valve is closed; a Maximum Information Coefficient feature metric for an entirety of a given operational phase for each parameter of the plurality of parameters; and, a Maximum Information Coefficient feature metric for a time window in the given operational phase after the valve is opened and closed for each parameter of the plurality of parameters.

In one aspect, in combination with any example above or below, the first operational phase and the second operational phase are the same phase of operation of the complex system collected at different legs of operation.

In one aspect, in combination with any example above or below, the monitoring the plurality of parameters includes normalizing operational data of the plurality of parameters.

The present disclosure provides, in another embodiment, a method for fault prediction in valve systems, comprising: collecting data from a plurality of sensors of a subsystem of a complex system related to opening and closing of a valve of the subsystem during a given operational phase of the complex system to identify a plurality of parameters; generating a plurality of feature metrics based on the plurality of parameters; determining whether the feature metrics indicate a prefault state of the subsystem based on a Bayesian framework; and, in response to determining that the feature metrics indicate the prefault state of the subsystem, generating a notification.

In one aspect, in combination with any example above or below, the plurality of parameters include: temperature; pressure; state data for a component of the subsystem; humidity; and, flowrate.

In one aspect, in combination with any example above or below, the plurality of feature metrics include: a maximum value feature metric for each parameter of the plurality of parameters during the given operational phase; a minimum value feature metric for each parameter of the plurality of parameters during the given operational phase; and, a mean value feature metric for each parameter of the plurality of parameters during the given operational phase.

In one aspect, in combination with any example above or below, the plurality of feature metrics include: an open/close imbalance feature metric derived from state data indicating a portion of time for which the valve is open relative to time for which the valve is closed during the given operational phase; a Maximum Information Coefficient feature metric for an entirety of a given operational phase for each parameter of the plurality of parameters during the given operational phase; and, a Maximum Information Coefficient feature metric for a time window in the given operational phase after the valve is opened and closed for each parameter of the plurality of parameters during the given operational phase.

In one aspect, in combination with any example above or below, monitoring the plurality of parameters includes normalizing operational data of the plurality of parameters.

In one aspect, in combination with any example above or below, determining whether the feature metrics indicate the prefault state of the subsystem based on the Bayesian framework includes: determining an aggregate probability of fault based on a deviation from a historic mean value for each feature metric of the feature metrics.

In one aspect, in combination with any example above or below, generating the notification includes generating a visualization of a data series plot for each feature metric indicating a current value of a given feature metric of the feature metrics relative to a confidence threshold that is based on a standard deviation from the historic mean value for the given feature metric.

In one aspect, in combination with any example above or below, generating the notification includes transmitting the notification to a maintenance scheduler, and wherein the notification includes an average time from detection of the prefault state to a fault in the subsystem.

The present disclosure further provides a method for fault monitoring comprising: generating a Bayesian framework for identifying prefault states in a subsystem of a complex system, comprising: collecting a plurality of historical parameters related to opening and closing of a valve of the subsystem across a plurality of operational legs of the complex system; generating a plurality of historical feature metrics based on the plurality of historical parameters and for the operational legs of the plurality of operational legs; in response to detecting a fault in the subsystem, defining a prefault state corresponding to the historical feature metrics; monitoring a plurality of operational parameters of the subsystem related to opening and closing of the valve during a given operational phase of an operational leg; generating a plurality of operational feature metrics based on the plurality of operational parameters monitored during the given operational phase; and, in response to determining using the generated Bayesian framework that the operational feature metrics indicate the prefault state of the subsystem, generating a notification.

In one aspect, in combination with any example above or below, the plurality of historical parameters and the plurality of operational parameters include: temperature; pressure; state data for a component of the subsystem; humidity; and, flowrate.

In one aspect, in combination with any example above or below, the plurality of historical feature metrics include: a maximum value feature metric for each parameter of the plurality of historical parameters during a given operational leg of the plurality of operational legs; a minimum value feature metric for each parameter of the plurality of historical parameters during the given operational leg of the plurality of operational legs; a mean value feature metric for each parameter of the plurality of historical parameters during the given operational leg of the plurality of operational legs; an open/close imbalance feature metric derived from state data indicating a portion of time for which the valve is open relative to time for which the valve is closed during the given operational leg of the plurality of operational legs; a Maximum Information Coefficient feature metric for an entirety of the given operational phase for each parameter of the plurality of parameters during the given operational leg of the plurality of operational legs; and, a Maximum Information Coefficient feature metric for a time window in the given operational leg after the valve is opened and closed for each parameter of the plurality of parameters.

In one aspect, in combination with any example above or below, the plurality of operational feature metrics include: a maximum value feature metric for each parameter of the plurality of operational parameters during the given operational phase of the operational leg; a minimum value feature metric for each parameter of the plurality of operational parameters during the given operational phase of the operational leg; a mean value feature metric for each parameter of the plurality of operational parameters during the given operational phase of the operational leg; an open/close imbalance feature metric derived from state data indicating a portion of time for which the valve is open relative to time for which the valve is closed; a Maximum Information Coefficient feature metric for an entirety of the given operational phase for each parameter of the plurality of operational parameters; and, a Maximum Information Coefficient feature metric for a time window in the given operational phase after the valve is opened and closed for each parameter of the plurality of operational parameters.

In one aspect, in combination with any example above or below, monitoring the plurality of operational parameters includes normalizing operational data of the plurality of operational parameters.

In one aspect, in combination with any example above or below, generating the notification includes transmitting the notification to a maintenance scheduler, and wherein the notification includes an average time from detection of the prefault state to a fault in the subsystem.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings.

DETAILED DESCRIPTION

The present disclosure relates to fault prediction through use of a Bayesian framework (also referred to as a Bayesian model or, in general, a framework). More particularly, the operational data of a complex system are used to develop a Bayesian framework to determine whether a given subsystem is in a prefault state based on historical data. Once a subsystem is determined to be in a prefault state, that subsystem can be repaired or replaced at a scheduled time, thus reducing the downtime of the complex system for unscheduled maintenance. The Bayesian framework does not require a physical model of the subsystems in question to determine whether those subsystems are in nominal or prefault states, which allows for greater flexibility in sourcing replacement parts, and a reduction in the expenditure of computing resources in generating, maintaining, and analyzing data according to a plurality of physical models. Moreover, as the Bayesian framework is developed, additional computing resources are saved compared to physical model solutions, as several subsystems with different physical components (that would require several different physical models) may be analyzed in light of a single Bayesian framework.

Although several examples are given in the present disclosure of a complex system being a particular complex system, such as an aircraft, one of ordinary skill in the art will appreciate that other complex systems (e.g., automobiles, ships, factories, rockets, buildings, bridges) are also considered for the purposes of the present disclosure. Similarly, although examples related to operational data are related to data gathered during flight operations (e.g., inflight data), it will be appreciated that operational data includes other modes of operation for aircraft and for other particular types of complex systems (e.g., driving data, cruising data, shift data, launch data, loading data). Additionally, specific examples are given herein in regard to the subsystem including airflow valves, although it will be appreciated that the teachings of the present disclosure may be applied to more than one and to different subsystems of a complex system for which operational data are gathered.

Figure 1:
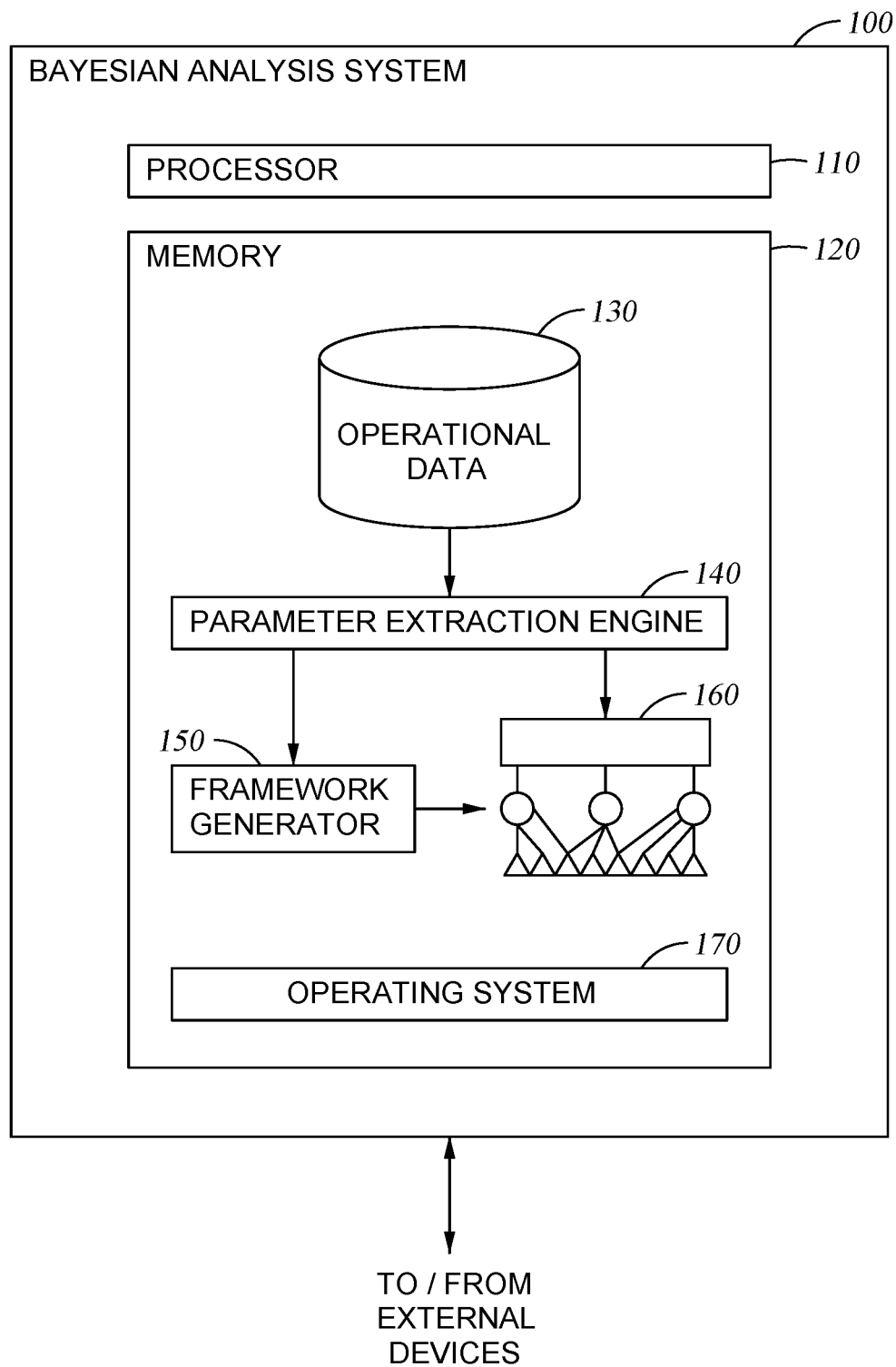
FIG. 1 illustrates an example architecture of a Bayesian analysis system according to aspects of the present disclosure.

Turning now to FIG. 1, an example architecture of a Bayesian analysis system 100 is provided. The Bayesian analysis system 100 is a computing device, which includes a processor 110 and a memory 120. The processor 110 retrieves and executes programming instructions stored in the memory 120 as well as stores and retrieves application data residing in the memory 120. A bus is used to transmit programming instructions and application data between processor 110, memory 120, I/O devices, and a network interface (not shown) to communicate with external devices. External devices are computing devices that include, but are not limited to: on-board computers of complex systems, external operator devices (e.g., devices associated with maintenance personnel), diagnostic systems, etc.

The processor 110 generally represents any piece of computer hardware that is capable of processing information such as, for example, data, computer programs and/or other suitable electronic information. The processor 110 is composed of a collection of electronic circuits some of which may be packaged as an integrated circuit or multiple interconnected integrated circuits (an integrated circuit at times more commonly referred to as a "chip"). The processor 110 is configured to execute computer programs, which may be stored onboard the processor or otherwise stored in the memory 120 (of the same or another apparatus). The processor 110 may represent a number of processors, a multi-processor core or some other type of processor, depending on the particular implementation. Further, the processor 110 may be implemented using a number of heterogeneous processor systems in which a main processor is present with one or more secondary processors on a single chip. As another illustrative example, the processor 110 may be a symmetric multi-processor system containing multiple processors of the same type. In yet another example, the processor 110 may be embodied as or otherwise include one or more application-specific integrated circuits (ASICs), field-programmable gate arrays (FPGAs) or the like. Thus, although the processor 110 may be capable of executing a computer program to perform one or more functions, the processor of various examples may be capable of performing one or more functions without the aid of a computer program.

The memory 120 generally represents any piece of computer hardware that is capable of storing information such as, for example, data, computer programs (e.g., computer-readable program code) and/or other suitable information either on a temporary basis and/or a permanent basis. The memory 120 may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), digital versatile disk (DVD), or the like. Although shown as a single unit, memory 120 may be a combination of fixed and/or removable storage devices, such as fixed disc drives, removable memory cards, or optical storage, network attached storage (NAS), or a storage area-network (SAN). Additionally, although shown as a component of the Bayesian analysis system 100, the memory may also include computer hardware disposed remotely from the structured maintenance system, such as, for example, external hard drives, networked storage, distributed systems and databases, cloud storage, and the like.

In various instances, the memory 120 may be referred to as a computer-readable storage medium. The computer-readable storage medium is a non-transitory device capable of storing information, and is distinguishable from computer-readable transmission media, such as electronic transitory signals capable of carrying information from one location to another. Computer-readable medium as described herein may generally refer to a computer-readable storage medium or computer-readable transmission medium.

In addition to the memory 120, the processor 110 may also be connected to one or more interfaces for displaying, transmitting and/or receiving information. The interfaces may include a communications interface (e.g., communications unit) and/or one or more user interfaces one example of which may be a network interface. The network interface may be configured to transmit and/or receive information, such as to and/or from another apparatus(es), network(s) or the like. The network interface may be configured to transmit and/or receive information by physical (wired) and/or wireless communications links. Examples of suitable communication interfaces include a network interface controller (NIC), wireless NIC (WNIC) or the like.

The user interfaces may include a display and/or one or more user input interfaces (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

The memory 120 contains a database of operational data 130, a parameter extraction engine 140, a framework generator 150, a framework 160, and an operation system 170. Generally, the operating system 170 represents software that is configured to manage computing hardware and software resources on the Bayesian analysis system 100. The operating system 170 may further provide computing services for software applications executing on the Bayesian analysis system 100.

The database of operational data 130 provides a repository of operational data for the complex system. For aircraft, the operational data may include operational data provided from a Flight Data Recorder (FDR), Quick Access Record (QAR), Continuous Parameter Logging System (CPL), and the Enhanced Airborne Flight Recorder (EAFR). The operational data may be gathered from several complex systems (e.g., more than one aircraft) over several periods of time, and are identifiable by the parameters measured, when the parameters were measured, a phase of operation during which the parameters were measured, the individual complex system from which the parameters were measured, and the like. Generally, the operational data are a collection of time-series measurements. Examples of operational data for an aircraft include, but are not limited to: parameters describing the altitude of the aircraft, speed of the aircraft, temperature data, pressure data, valve state data (e.g., open/closed), humidity data, flowrate data, etc. Additionally, any maintenance messages or alert conditions associated with a given parameter may be stored in association with the operational data in the database of operational data 130.

Operational data may be gathered from one or more specific subsystems of the complex system (and/or multiple complex systems of a similar type) that may include various components and sensors that monitor the parameters of the subsystem. Examples of subsystems in an aircraft-type complex system include, but are not limited to: a lighting system, an inflight entertainment system, the Economy Cooling Valve (ECV) system, an Environmental Control System (ECS), a fuel system, a pneumatic system, etc. Examples of components of the subsystems that may be specifically monitored include, but are not limited to: shut-off valves (i.e., a valve that operates in one of an open state or a closed state to regulate fluid flow in the subsystem), variable flow-rate valves (i.e., a valve that operates at several positions between open and closed), compressors, pumps, heat exchangers, and the like. The sensors are physical devices which detect conditions, events, and changes in the respective subsystem or components thereof, and generate corresponding operational data. Examples of the sensors include temperature sensors, pressure sensors, airspeed sensors, humidity sensors, altitude sensors, and the like. For example, if a temperature sensor detects a 30° air temperature when a shut-off valve is closed, the temperature sensor converts the temperature reading to a digital format, applies a timestamp for when the reading was taken, and transmits an indication of the detected temperature to the database of operational data 130.

According to one embodiment, the parameter extraction engine 140 analyzes the operational data held in the database of operational data 130 to extract one or more parameter values from the operational data from a given operational phase. As will be appreciated, operational data may be collected across several "legs" or operations of the complex system, where each "leg" is divided into one or more operational phases. An operational phase for a leg relates to a specific range of time in the time series of operational data correlated to particular actions of the complex system. For example, for an aircraft, the operational phases within a given leg may include: gate operations, taxiing operations, takeoff/ascent operations, flight operations, descent/landing operations. In another example, for a drawbridge, the operational phases may include: normal operation, raising a span, maintaining a raised span, and lowering a span. The parameters that are extracted from the operational data may include the values of the measured parameter (e.g., a voltage, a current, a pressure, a temperature, a component state (e.g., open/closed, fault/no fault, on/off)), and a time at which the parameter was measured.

In some embodiments, the operational data are generated or collected in response to a control signal and/or a collection window. For example, with a subsystem that includes one or more valves, a control signal may open or close a given valve, and a data collection window may define that operational data related to the valve are collected for n seconds after an opening or closing event is signaled. In other examples, a time window within the collected data is used for parameter analysis. For example, data may be gathered periodically during a given phase, but only the operational data that is gathered within an n second window after a predefined event is used for analysis.

The framework generator 150 may receive the parameters extracted by the parameter extraction engine 140 during a learning phase to construct a framework 160. The framework 160 generated by the framework generator 150 could then receive additional values for the parameters in a given operational phase and develop a plurality of feature metrics from the plurality of parameters. The feature metrics may include in various embodiments the maxima, minima, and average (mean, median, mode) values for one or more parameters in the given phase, the maxima, minima, and average (mean, median, mode) values for one or more parameters in a given window of observation, and/or derived feature metrics from multiple parameter metrics. Examples of derived feature metrics include, but are not limited to: an open/close imbalance in a valve for a given phase or time window or a Maximal Information Coefficient (MIC) for a given phase or time window.

A MIC is a derived measurement that provides a snapshot of the operational characteristics associated with component operation. Using a valve in the subsystem, as an example, a time index at which that valve is opened and closed is determined and the maximum and minimum values for one or more parameters are taken n seconds after the open event and the close event, and the differences between the maxima and minima are set as the MIC value for those parameters. For example, a temperature of a fluid controlled by a valve may be measured at valve opening until n seconds after valve closing, as ranging between X degrees and Y degrees, and the MIC for the fluid temperature will be $\Delta(X, Y)$. In various embodiments, MIC may be expressed as an absolute value or a signed value based on a time at which the maximum value is observed relative to the minimum value (e.g., $|X-Y|$, or $X-Y$, where X is the earlier measured value in the time series operation data). Additionally, a MIC may be measured for an entire operational phase (e.g., where X and Y are the maxima and minima in an operational phase) or in response to particular event (e.g., a main valve open/close).

The framework generator 150 may detect faults in the various subsystems of the complex systems from a given operational phase in the operation data and associate the feature metrics and parameters in earlier operation phases (relative to the faulted operational phase) with a prefault state for the faulted subsystem. As will be appreciated, the temporal association of prefault states with fault states may vary across embodiments. In one example, a prefault state is associated with the operational data for the past n operations of the complex system (e.g., the operation data gathered in last five flights of an aircraft before a fault are associated with a prefault state). In a second example, a prefault state is associated with the operational data gathered in the past n days (e.g., all operational data gathered in the five days prior to a fault are associated with a prefault state). In a third example, a prefault state is associated with the operational data based on a level of deviation from the mean of the operational data (e.g., when the values are more than no from the mean).

The framework 160 may be constructed in an unsupervised state based on the historical operational data and provide a Bayesian analysis of a current data set. The parameter extraction engine 140 may provide the extracted features to the trained framework 160, which can generate the plurality of feature metrics from the values thereof, and determine whether the feature metrics indicate that the subsystem is exhibiting values for a prefault state. The Bayesian analysis system 100 may use the strength of association of one or more of the feature metrics with a fault state to predict whether the subsystem is in a prefault state via a statistical inference that the current parameter values (and therefore the feature metrics) indicate that a fault is imminent. Stated differently, as the values indicated by the currently analyzed feature metrics approach the values of feature metrics previously linked to a lead-up to a fault state in the subsystem, the framework 160 may output a notification that the subsystem is in a prefault state.

As will be appreciated, the Bayesian analysis system 100 may compare a plurality of feature metrics with a fault detection threshold to determine whether the subsystem is in a prefault state, each of which may be weighted evenly or unevenly when determining whether the subsystem is in a prefault state. In one example, when using six feature metrics, each feature metric may provide one sixth of the score used to determine whether the fault detection threshold is satisfied. In another example, also using six feature metrics, three feature metrics for a mean, a maximum, and a minimum value observed during a phase may each provide 10% of the score, whereas three feature metrics for a MIC for a time window, a MIC for the phase, and an open/close balance may each provide 23% of the score. As will be appreciated other weights (including 0% and 100%) may be applied to individual feature metrics, and the above examples are provided as non-limiting illustrations.

In some embodiments, the Bayesian analysis system 100 generates a notification in response to an analysis provided by the framework 160 that indicates whether the subsystem is in a prefault or a nominal state. The notification may be transmitted to an external device as an alert, stored for later transmittal, or logged. In various embodiments, a derived feature metric related to a time between detection of the prefault state and the fault state is included in the notification so that preventative maintenance may be scheduled (or co-scheduled with other maintenance), so that unscheduled downtime of the complex system may be reduced relative to strategies that rely on service life and/or detecting faulted systems.

Figure 2:
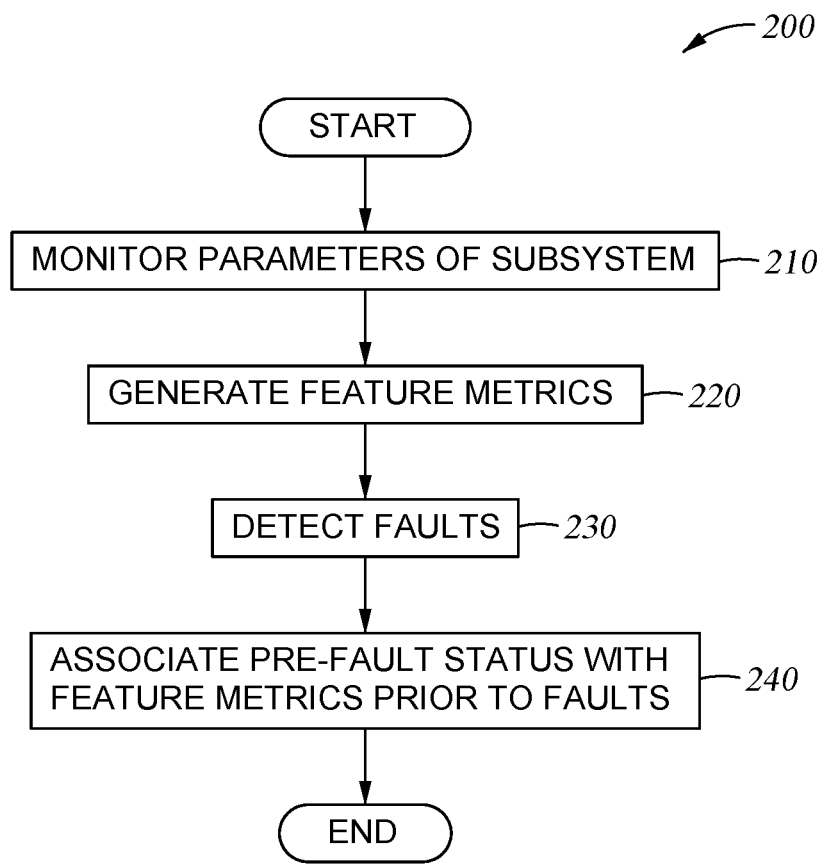
FIG. 2 is a flowchart showing general operations in an example method for constructing a framework for fault prediction according to aspects of the present disclosure.

FIG. 2 is a flowchart showing general operations in an example method for constructing a framework for fault prediction according to aspects of the present disclosure. Method 200 begins with block 210, where parameters of a subsystem of a complex system are monitored. In various embodiments, the parameters are measured constantly (which may include analog signals and the periodic sampling of an analog signal), while in other embodiments the parameters are measured in response to an event in the subsystem or the complex system (e.g., a clock signal for generating a sample). In yet other embodiments, the parameters are measured constantly, but may be filtered to provide operational data for a subset of the monitored dataset. For example, a plurality of parameters may be monitored during a first operational phase of a complex system. In another example, a plurality of parameters may be monitored based on a status of a component in the subsystem or the complex system (e.g., an open/closed state of a valve, a raised/lowered state of a bridge span, a speed of a vehicle exceeding a limit).

In one embodiment, the complex system, the subsystem in question, or a separate monitoring system of the complex system may measure and collect the values of the parameters during operation of the complex system and transmit the operational data to the Bayesian analysis system 100 in real-time (or near real-time) to thereby monitor the parameters in real-time (or near real-time). In another embodiment, the Bayesian analysis system 100 receives the measured values of the operational data from the complex system in batches for batched analysis. For example, with a complex system of an aircraft, the aircraft may offload collected operational data to a groundside Bayesian analysis system 100 (e.g., a computing device that is not a subsystem of the aircraft).

In various embodiments, monitoring the parameters includes formatting the operational data received from the complex system into a normalized dataset. For example, the operational data from multiple complex systems (e.g., a first aircraft and a second aircraft), may be formatted to add a complex system identifier. In a second example, the operational data may be correlated into a tabular format using a shared time signature. To illustrate, consider operational data measured by a first sensor and by a second sensor of a subsystem that are each collected periodically at a respective first rate and second rate of collection. These operational data may be originally collected without a timestamp, or inconsistent timestamps (e.g., $measurement_1$ and $measurement_2$ of $sensor_1$ at $time_1$ and $time_2$, but $measurement_3$ and $measurement_4$ of $sensor_2$ at $time_1$ and $time_3$), and a consistent shared timestamp may therefore be added or replace previous timestamps associated with the data.

Additionally, monitoring the parameters may include filtering the operational data to remove values for parameters that are not used in later analyses. For example, operational data from a complex system may include several parameters of interest in fault prediction (e.g., temperatures, pressures, speeds, device statuses), as well as data that are not of interest in fault prediction (e.g., data from different subsystems, data for parameters not used in feature metric generation) that may be filtered out of data received, or otherwise not extracted by a parameter extraction engine 140. Additionally, particular operation phases of the complex system may be of greater or lesser interest in fault prediction. For example, data measured during a landing phase (or gate operations phase, taxiing operations phase, takeoff/ascent phase, flight phase, etc.) may be determined to be of particular interest in fault prediction, and only those data are extracted from the measured operational data for training a framework 160.

Method 200 proceeds to block 220, where the Bayesian analysis system 100 generates a plurality of feature metrics based on the plurality of parameters. Depending on the parameters extracted from the operational data, and the feature metrics selected for generation by a user, more or fewer feature metrics may be generated in different embodiments. In a first embodiment, the Bayesian analysis system 100 generates feature metrics that identify the maximum, minimum, and mean values for the parameters measured in the dataset. In a second embodiment related to a valve, the Bayesian analysis system 100 generates feature metrics that identify the maximum, minimum, and mean values for the parameters measured in the dataset as well as a MIC for the parameters during a time window after the valve opens and closes, a MIC for an entire operational phase, and/or a time balance for the valve being opened or closed during the operational phase.

Proceeding to block 230, faults in the subsystem are detected. In various embodiments, the detected faults are indicated in maintenance messages associated with a given operational phase or by manual entry of the fault after an alert or inspection identifies the fault. For example, when a maintenance message indicates a fault in the subsystem after a flight of an aircraft (the example complex system), the data in the operational phases of that flight may be associated with a fault state. In various embodiments, the Bayesian analysis system 100 detects the faults in the subsystem based on operational data received from complex systems (and aggregated in a database of operational data 130) that satisfy failure thresholds for the subsystem. In other embodiments, the sensors in the complex systems, subject matter experts, maintenance personnel, etc. tag the operational data with a failure state via maintenance messages or alerts that indicate the occurrence of faults.

At block 240, the Bayesian analysis system 100 associates a prefault status with the feature metrics for the operational phases occurring before the operational phase in which the fault was detected. For example, with a complex system of an aircraft for which data are analyzed in a descent/landing phase, a Probability Distribution Function (PDF) may be used to determine in a Bayesian analysis of when a prefault status may be reliably and accurately determined with the given dataset to associate a prefault status with the feature metrics.

The distribution of the data is calculated to determine whether a given value falls outside of a "nominal" distribution range and into a "prefault" distribution range. As used herein, P(Y|X) indicates the probability of Y given an input X. For example, for a complex system, the probability of "No_Fault" given a Feature Metric$_y$ and Parameter$_x$ is given as P(No_Fault|Feature Metric$_i$, Parameter$_j$)). A PDF is determined for each combination of parameter 'j' and feature metric 'i', and a Gaussian distribution of the values is assumed for the PDF. For example, in a complex system with 28 parameters and six feature metrics, there will be 168 probability distributions (28*6) with corresponding means and variances. The PDF for computing the probability of No_Fault given a Feature Metric 'i' and a particular parameter 'j', with a value X at that combination of feature metric and parameter may be expressed according to Equation 1, where $\mu_{ij}$ and $\sigma_{ij}$ are the respective mean and variance for feature metric 'i' and parameter 'y' of value X.

$$P(\text{No\_Fault} | \text{Feature Metric}_i, \text{Parameter}_j) = \frac{1}{\sqrt{2\pi\sigma_{xy}^2}} e^{-\frac{(X-\mu_{xy})^2}{2\sigma_{xy}^2}}$$

Equation 1

Because the framework 160 is developed without supervision, associating the prefault status with the feature metrics does not require validation, although users may validate the accuracy and reliably of the framework 160 independently or for acceptance policies. Additionally, a user may set a minimum amount of operational data and/or a minimum number of detected fault conditions before a framework 160 will be considered to have associated the prefault statuses with the feature metrics according to a Bayesian framework to ensure that a statistically significant association is established. Method 200 concludes once sufficient operational data have been gathered, sufficient fault states have been observed, and/or a confidence threshold that the association is statistically significant (e.g., α≥0.95) is satisfied, although it will be appreciated that method 200 may be continuously or periodically rerun as additional operational data are collected, to update the PDFs to reflect the distribution of values associated with the additional operational data.

Figure 3:
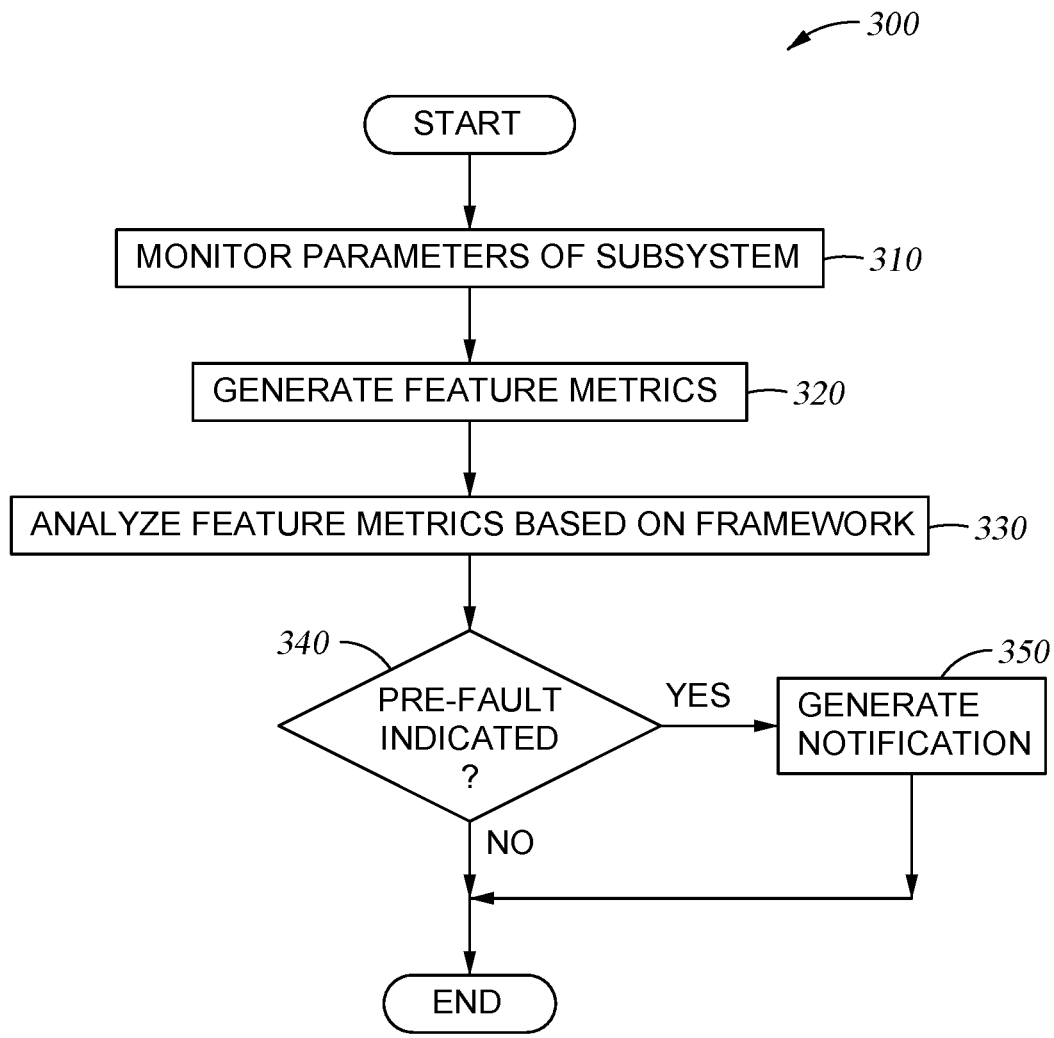
FIG. 3 is a flowchart showing general operations in an example method for using a framework for fault prediction according to aspects of the present disclosure.

FIG. 3 is a flowchart showing general operations in an example method for using a framework 160 for fault prediction according to aspects of the present disclosure. Method 300 begins with block 310, where a Bayesian analysis system 100 having a trained framework 160 (e.g., produced according to method 200, discussed in greater detail in regard to FIG. 2), monitors parameters of a subsystem of a complex system. In various embodiments, the parameters are monitored constantly, while in other embodiments the parameters are monitored in response to an event in the subsystem or the complex system. In yet other embodiments, the parameters are monitored by a computing device on the complex system and are offloaded to an external Bayesian analysis system 100 to monitor a particular operational phase for the complex system. As will be appreciated, the monitored parameters may be filtered to provide operational data for a subset of the monitored dataset. For example, a plurality of parameters may be monitored during a first operational phase of a complex system. In another example, a plurality of parameters may be monitored based on a status of a component in the subsystem or the complex system (e.g., an open/closed state of a valve, a raised/lowered state of a bridge span, a speed of a vehicle exceeding a limit).

In various embodiments, monitoring the parameters includes formatting the operational data received from the complex system into a normalized dataset. For example, the operational data from multiple complex systems (e.g., a first aircraft and a second aircraft), may be formatted to add a complex system identifier. In a second example, the operational data may be correlated into a tabular format using a shared time signature. To illustrate, consider operational data measured by a first sensor and by a second sensor of a subsystem that are each collected periodically at a respective first rate and second rate of collection. These operational data may be originally collected without a timestamp, or inconsistent timestamps (e.g., measurement$_1$ and measurement$_2$ of sensor$_1$ at time$_1$ and time$_2$, but measurement$_3$ and measurement$_4$ of sensor$_2$ at time$_1$ and time$_3$), and a consistent shared timestamp may therefore be added or replace previous timestamps associated with the data.

Additionally, monitoring the parameters may include filtering the operational data to remove values for parameters that are not used in later analyses. For example, operational data from a complex system may include several parameters of interest in fault prediction (e.g., temperatures, pressures, speeds, device statuses), as well as data that are not of interest in fault prediction (e.g., data from different subsystems, data for parameters not used in feature metric generation) that may be filtered out of data received, or otherwise not extracted by a parameter extraction engine 140. Additionally, particular operation phases of the complex system may be of greater or lesser interest in fault prediction. For example, data measured during a landing phase (or gate operations phase, taxiing operations phase, takeoff/ascent phase, flight phase, etc.) may be determined to be of particular interest in fault prediction, and only those data are extracted from the measured operational data for training a framework 160.

Method 300 proceeds to block 320, where the Bayesian analysis system 100 generates a plurality of feature metrics based on the plurality of parameters. Depending on the parameters extracted from the operational data, and the feature metrics selected for generation by a user, more or fewer feature metrics may be generated in different embodiments. In a first embodiment, the Bayesian analysis system 100 generates feature metrics that identify the maximum, minimum, and mean values for the parameters measured in the dataset. In a second embodiment related to a valve, the Bayesian analysis system 100 generates feature metrics that identify the maximum, minimum, and mean values for the parameters measured in the dataset as well as a MIC for the parameters during a time window after the valve opens and closes, a MIC for an entire operational phase, and/or a time balance for the valve being opened or closed during the operational phase.

Proceeding to block 330, the Bayesian analysis system 100 analyzes the feature metrics based on the framework 160 to determine whether the feature metrics indicate a prefault state of the subsystem based on the framework 160. The individual PDFs for whether a given feature metric indicates that the subsystem is in a prefault state may be determined according to Equation 2. According to Equation 2, the Bayesian analysis system 100 may determine the probability of No_Fault for a particular feature metric, (e.g., Feature Metric$_i$, i.e., P(No_Fault|Feature Metric$_i$) by summing the probabilities of P(No_Fault|Feature Metric$_i$, Parameter$_j$) across all parameters, represented by the subscript $_j$, while multiplying each Parameter by the prior probability or confidence value, (i.e., P(Parameter$_j$)).

$$P(\text{No\_Fault}|\text{Feature Metric}_i) = \Sigma_j[P(\text{No\_Fault}|\text{Feature Metric}_i, \text{Parameter}_j) * P(\text{Parameter}_j)] \quad \text{Equation 2}$$

As the Bayesian analysis system 100 may analyze a plurality of feature metrics to determine whether the subsystem in in a prefault state, the Bayesian analysis system 100 may aggregate the PDFs for the feature metrics according to Equation 3. The probability of No_Fault given in Equation 3 represents an overall inference that the currently measured values of the parameters (and in turn the feature metrics) will result in a determination that the subsystem is not in a fault or prefault state based on the available operational data. According to Equation 3, the Bayesian analysis system 100 may determine the probability of No_Fault for the subsystem by summing the PDFs of the feature metrics (per Equation 2) multiplied by the prior probabilities (i.e., P(Feature Metric$_i$)) or confidence values of that particular feature metric. Although each feature metric in Equation 3 is weighted equally, it will be appreciated that other formulations that give greater or lesser weight to individual feature metrics are contemplated.

$$P(\text{No\_Fault}) = \Sigma_i[P(\text{No Fault}|\text{Feature Metric}_i) * P(\text{Feature Metric}_i)] \quad \text{Equation 3}$$

Although Equation 2 and Equation 3 detail formulas for determining a probability for a "nominal" or "no fault" status for a given value of a feature metric, it will be appreciated that Equation 2 and Equation 3 may be modified to determine a PDF for a "prefault" status. In other embodiments, the probability of nominal status is inverted to produce a probability of the parameters indicating that the subsystem is in a prefault status. For example, a probability of No_Fault of 80% may be inverted to produce a probability of prefault of 20%.

At block 340, the Bayesian analysis system 100 determines whether the feature metrics indicate that the system is in a prefault state. The Bayesian analysis system 100 compares the probability of no_fault (or prefault) against a confidence threshold set in the framework 160 for determining whether the subsystem is in a prefault state. In various embodiments, the confidence threshold is set such that values for a given feature metric more than, for example, 2.5 standard deviations (i.e., 2.5σ) from the mean of the dataset for that feature metric will indicate a prefault state (although other values may be set for the confidence threshold). As will be appreciated, the Bayesian analysis system 100 may analyze a plurality of feature metrics together to determine whether the subsystem is in a prefault state, and more than one feature metric may need to indicate that the subsystem is in a prefault state for the plurality of feature metrics in aggregate to indicate that the subsystem is in a prefault state. Individual feature metrics in the plurality of feature metrics may be weighted differently from or the same as other feature metrics in the plurality when determining whether the aggregate analysis indicates that the subsystem is in a prefault state.

In response to a determination that the probability no_fault/prefault satisfies the confidence threshold for the subsystem being in the prefault state, method 300 proceeds to block 350. In response to a determination that the probability no_fault/prefault does not satisfy the confidence threshold for the subsystem being in the prefault state, method 300 may conclude or optionally proceed to block 350 to generate a notification of the subsystem not being in the prefault state.

Proceeding to block 350, the Bayesian analysis system 100 generates a notification detailing the inferred nominal/prefault status of the subsystem. In some embodiments, the notification is transmitted as an alert detailing which features and/or parameters indicate that the subsystem is determined to be in a prefault state. In other embodiments, the notification is transmitted as a clear signal detailing that the subsystem is not indicated to be in a prefault state. In some embodiments, the Bayesian analysis system 100 transmits the notification of a prefault state to a maintenance scheduler system so that a maintenance period may be scheduled for the subsystem at a planned time. Such messages to maintenance schedulers may include historical data indicating an average time from detection of the prefault state to a fault in the subsystem to help the maintenance scheduler determine when to schedule maintenance and whether additional maintenance activities may be co-scheduled. In a further embodiment, the notification includes a visualization of the subsystem and where the measured feature metrics fall in the observed distributions thereof. Method 300 may then conclude.

Figure 4:
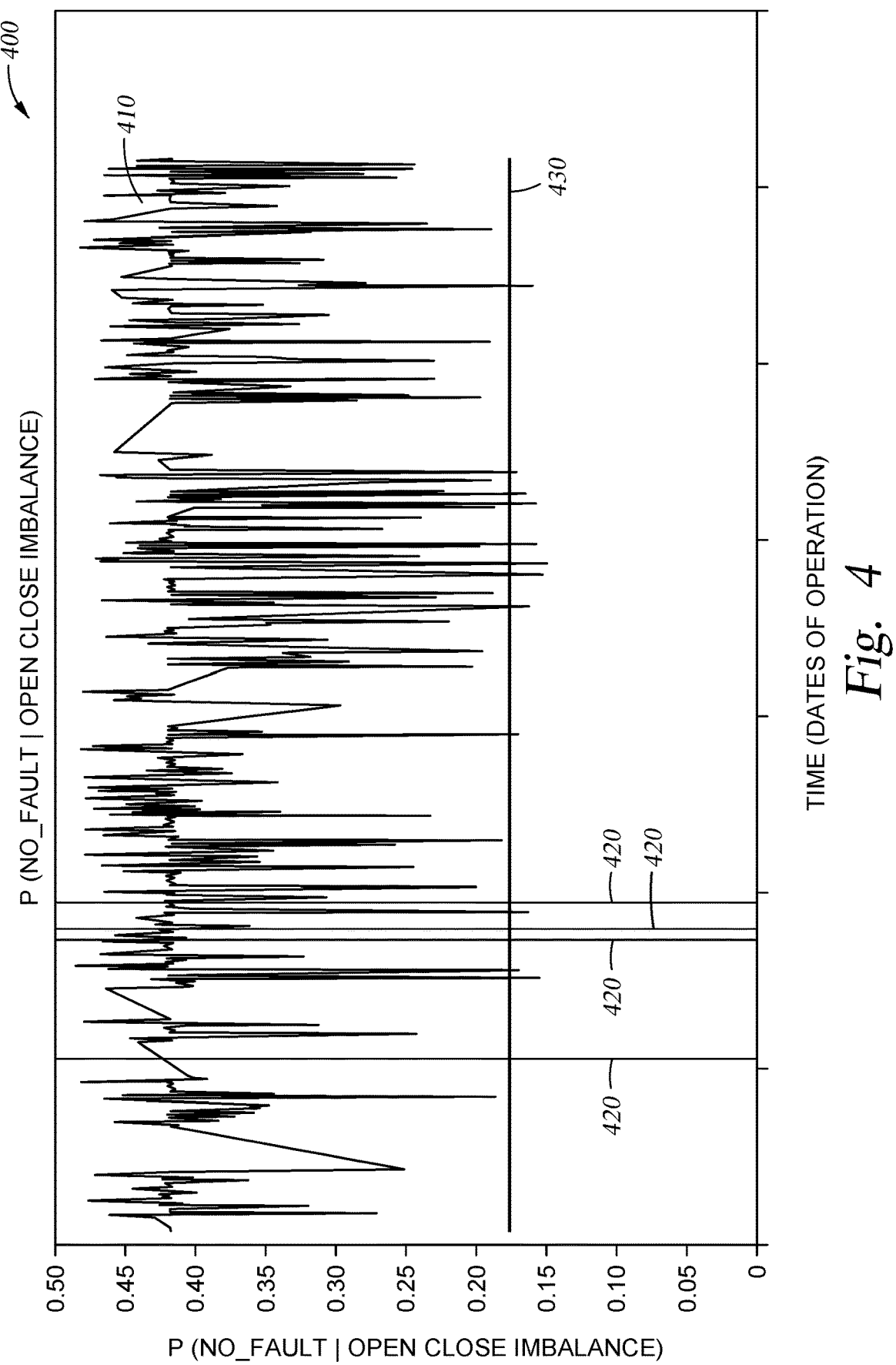
FIG. 4 illustrates a visualization that may be generated as part of a notification according to aspects of the present disclosure.

FIG. 4 illustrates a visualization 400 that may be generated as part of a notification. Although FIG. 4 illustrates a visualization 400 for one particular feature metric, the example given herein will be understood in relation to other feature metrics. The visualization 400 is presented in FIG. 4 as a time series graph for the probability of no-fault with respect to a feature metric of an open/close imbalance. The data series plot 410 for the calculated value for this property is shown over time, and is overlaid with indicators 420 for when a fault was detected (e.g., when maintenance messages related to the subsystem were generated). Additionally, a marker 430 for the value set for a confidence threshold is shown in the visualization, indicating where points in the data series plot 410 deviate from the mean of the data series by more than a predefined amount (e.g., by at least 2.5σ).

It will be noticed in the example visualization 400 that several data points in the data series plot 410 approach or exceed that confidence threshold, but are not shown in proximity to indicators 420 for fault states, and therefore are not associated with a prefault state, while some of the data points in the data series plot 410 that approach or exceed the confidence threshold are shown in proximity to indicators 420, and therefore are associated with a prefault state. As will be appreciated, because the example visualization 400 is shown for one feature metric, and a plurality of feature metrics may be combined for a Bayesian inference, the determination as to whether a subsystem is in a prefault state may rely on the probabilities of no-fault with respect to several feature metrics viewed in aggregate. These several feature metrics may be weighted evenly or unevenly amongst one another when determining whether the plurality of feature metrics indicate that the subsystem is in a prefault state.

One or more visualizations 400 may be provided in a notification so that users may identify potential causes of the fault state, identify trends in the operational data, and better understand interactions in the subsystem that lead to or are associated with fault states.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a DVD, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   monitoring a plurality of parameters of a subsystem of a system related to opening and closing of a valve of the subsystem;
   collecting a first set of data values for the plurality of parameters during a first operational phase of the system;
   generating a first plurality of feature metrics based on first set of data values for the plurality of parameters;
   detecting a fault in the subsystem in a second operational phase of the system, wherein the first operational phase and the second operational phase are a same phase of operation of the system collected at different legs of operation;
   collecting a second set of data values for the plurality of parameters during the second operational phase of the subsystem;
   generating a second plurality of feature metrics based on second set of data values for the plurality of parameters; and
   defining a prefault state for the feature metrics according to a Bayesian framework based on the first plurality of feature metrics and the second plurality of feature metrics.

2. The method of claim 1, wherein the plurality of parameters are selected from a group including:
   temperature;
   pressure;
   state data for a component of the subsystem;
   humidity; and
   flowrate.

3. The method of claim 1, wherein the plurality of feature metrics are selected from a group including:
   a maximum value feature metric for each parameter of the plurality of parameters;
   a minimum value feature metric for each parameter of the plurality of parameters; and
   a mean value feature metric for each parameter of the plurality of parameters.

4. The method of claim 1, wherein the plurality of feature metrics are selected from a group including:
   an open/close imbalance feature metric derived from state data indicating a portion of time for which the valve is open relative to time for which the valve is closed;
   a Maximum Information Coefficient feature metric for an entirety of a given operational phase for each parameter of the plurality of parameters; and
   a Maximum Information Coefficient feature metric for a time window in the given operational phase after the valve is opened and closed for each parameter of the plurality of parameters.

5. The method of claim 1, wherein monitoring the plurality of parameters includes normalizing operational data of the plurality of parameters.

6. A method, comprising:
   collecting data from a plurality of sensors of a subsystem of a system related to opening and closing of a valve of the subsystem during a given operational phase of the system to identify a plurality of parameters;
   generating a plurality of feature metrics based on the plurality of parameters, wherein the plurality of feature metric comprise at least one of:
   a maximum value feature metric for each parameter of the plurality of parameters during the given operational phase;
   a minimum value feature metric for each parameter of the plurality of parameters during the given operational phase;
   a mean value feature metric for each parameter of the plurality of parameters during the given operational phase
   an open/close imbalance feature metric derived from state data indicating a portion of time for which the valve is open relative to time for which the valve is closed during the given operational phase;
   a Maximum Information Coefficient feature metric for an entirety of a given operational phase for each parameter of the plurality of parameters during the given operational phase; and
   a Maximum Information Coefficient feature metric for a time window in the given operational phase after the valve is opened and closed for each parameter of the plurality of parameters during the given operational phase;
   determining whether the feature metrics indicate a prefault state of the subsystem based on a Bayesian framework, wherein the Bayesian framework is based on feature metrics from at least two operational phases of the system; and
   in response to determining that the feature metrics indicate the prefault state of the subsystem, generating a notification.

7. The method of claim 6, wherein the plurality of parameters include at least one of:
   temperature;
   pressure;
   state data for a component of the subsystem;
   humidity; and
   flowrate.

8. The method of claim 6, wherein monitoring the plurality of parameters includes normalizing operational data of the plurality of parameters.

9. The method of claim 6, wherein determining whether the feature metrics indicate the prefault state of the subsystem based on the Bayesian framework includes:
   determining an aggregate probability of fault based on a deviation from a historic mean value for each feature metric of the feature metrics.

10. The method of claim 9, wherein generating the notification includes generating a visualization of a data series plot for each feature metric indicating a current value of a given feature metric of the feature metrics relative to a confidence threshold that is based on a standard deviation from the historic mean value for the given feature metric.

11. The method of claim 6, wherein generating the notification includes transmitting the notification to a maintenance scheduler, and wherein the notification includes an average time from detection of the prefault state to a fault in the subsystem.

12. A method, comprising:
generating a Bayesian framework for identifying prefault states in a subsystem of a system, comprising:
collecting a plurality of historical parameters related to opening and closing of a valve of the subsystem across a plurality of operational legs of the system;
generating a plurality of historical feature metrics based on the plurality of historical parameters and for the operational legs of the plurality of operational legs;
in response to detecting a fault in the subsystem, defining a prefault state corresponding to the historical feature metrics;
monitoring a plurality of operational parameters of the subsystem related to opening and closing of the valve during a given operational phase of an operational leg;
generating a plurality of operational feature metrics based on the plurality of operational parameters monitored during the given operational phase; and
in response to determining, using the generated Bayesian framework, that the operational feature metrics indicate the prefault state of the subsystem, generating a notification, wherein the notification includes an average time from detection of the prefault state to a fault in the subsystem.

13. The method of claim 12, wherein the plurality of historical parameters and the plurality of operational parameters include:
temperature;
pressure;
state data for a component of the subsystem;
humidity; and
flowrate.

14. The method of claim 12, wherein the plurality of historical feature metrics include:
a maximum value feature metric for each parameter of the plurality of historical parameters during a given operational leg of the plurality of operational legs;
a minimum value feature metric for each parameter of the plurality of historical parameters during the given operational leg of the plurality of operational legs;
a mean value feature metric for each parameter of the plurality of historical parameters during the given operational leg of the plurality of operational legs; and
an open/close imbalance feature metric derived from state data indicating a portion of time for which the valve is open relative to time for which the valve is closed during the given operational leg of the plurality of operational legs;
a Maximum Information Coefficient feature metric for an entirety of the given operational phase for each parameter of the plurality of parameters during the given operational leg of the plurality of operational legs; and
a Maximum Information Coefficient feature metric for a time window in the given operational leg after the valve is opened and closed for each parameter of the plurality of parameters.

15. The method of claim 12, wherein the plurality of operational feature metrics include:
a maximum value feature metric for each parameter of the plurality of operational parameters during the given operational phase of the operational leg;
a minimum value feature metric for each parameter of the plurality of operational parameters during the given operational phase of the operational leg;
a mean value feature metric for each parameter of the plurality of operational parameters during the given operational phase of the operational leg;
an open/close imbalance feature metric derived from state data indicating a portion of time for which the valve is open relative to time for which the valve is closed;
a Maximum Information Coefficient feature metric for an entirety of the given operational phase for each parameter of the plurality of operational parameters; and
a Maximum Information Coefficient feature metric for a time window in the given operational phase after the valve is opened and closed for each parameter of the plurality of operational parameters.

16. The method of claim 12, wherein monitoring the plurality of operational parameters includes normalizing operational data of the plurality of operational parameters.

17. The method of claim 12, wherein generating the notification includes transmitting the notification to a maintenance scheduler.

18. A method, comprising:
collecting data from a plurality of sensors of a subsystem of a system related to opening and closing of a valve of the subsystem during a given operational phase of the system to identify a plurality of parameters;
generating a plurality of feature metrics based on the plurality of parameters;
determining whether the feature metrics indicate a prefault state of the subsystem based on a Bayesian framework by:
determining an aggregate probability of fault based on a deviation from a historic mean value for each feature metric of the feature metrics, wherein the Bayesian framework is based on feature metrics from at least two operational phases of the system; and
in response to determining that the feature metrics indicate the prefault state of the subsystem, generating a notification.

* * * * *